(12) United States Patent
Barnes

(10) Patent No.: US 9,976,469 B2
(45) Date of Patent: May 22, 2018

(54) FLEXIBLE INSULATION DEVICE

(71) Applicant: Thermal Structures, Inc., Corona, CA (US)

(72) Inventor: Vaughn V. Barnes, Corona, CA (US)

(73) Assignee: THERMAL STRUCTURES, INC., Corona, CA (US)

( * ) Notice: Subject to any disclaimer, the term of this patent is extended or adjusted under 35 U.S.C. 154(b) by 460 days.

(21) Appl. No.: 14/332,315

(22) Filed: Jul. 15, 2014

(65) Prior Publication Data

US 2015/0013948 A1 Jan. 15, 2015

Related U.S. Application Data

(60) Provisional application No. 61/887,014, filed on Oct. 4, 2013, provisional application No. 61/846,415, filed on Jul. 15, 2013.

(51) Int. Cl.

| | | |
|---|---|---|
| *F16L 9/14* | (2006.01) | |
| *F16L 9/18* | (2006.01) | |
| *F01N 13/18* | (2010.01) | |
| *F16L 59/153* | (2006.01) | |
| *F16L 59/21* | (2006.01) | |
| *F16L 27/10* | (2006.01) | |
| *F16L 27/107* | (2006.01) | |
| *F16L 51/00* | (2006.01) | |
| *F02M 26/11* | (2016.01) | |

(52) U.S. Cl.
CPC ......... *F01N 13/1816* (2013.01); *F02M 26/11* (2016.02); *F16L 27/1004* (2013.01); *F16L 27/107* (2013.01); *F16L 51/00* (2013.01); *F16L 59/153* (2013.01); *F16L 59/21* (2013.01)

(58) Field of Classification Search
CPC .. F01N 13/1816; F02M 26/11; F16L 27/1004; F16L 59/168
USPC .......................................... 138/149, 111–118
See application file for complete search history.

(56) References Cited

U.S. PATENT DOCUMENTS

| | | | | |
|---|---|---|---|---|
| 4,221,239 | A * | 9/1980 | Reale ...................... | F16L 59/07 138/108 |
| 4,502,714 | A * | 3/1985 | Brown .................... | F16L 51/03 138/149 |
| 4,735,235 | A * | 4/1988 | Anderson ............... | F16L 59/16 138/109 |
| 5,092,122 | A | 3/1992 | Bainbridge | |
| 5,112,661 | A * | 5/1992 | Pendergraft ........... | B29C 45/74 138/149 |
| 5,134,846 | A | 8/1992 | White | |
| 5,660,419 | A * | 8/1997 | Kim .................... | F01N 13/1816 138/109 |
| 6,996,977 | B2 * | 2/2006 | Simon .................... | F01N 13/14 285/266 |

(Continued)

*Primary Examiner* — Vishal Pancholi
(74) *Attorney, Agent, or Firm* — Fish IP Law, LLP

(57) ABSTRACT

A flexible conduit insulated to prevent unwanted heat transfer. The conduit is insulated by a jacket-like component that creates a space between the conduit and the jacket, where the gap can be filled with air or some other insulating material. The jacket is sealed to the flexible conduit by sealing components that are configured to slide along end cap portions of the flexible conduit. Because the conduit is flexible, it can couple two other conduits that move relative to one another such that fluid can flow from one area to another via the flexible conduit.

15 Claims, 7 Drawing Sheets

(56) References Cited

U.S. PATENT DOCUMENTS

| | | | |
|---|---|---|---|
| 7,431,896 B2* | 10/2008 | Biel, Jr. | B01D 53/9495 29/890 |
| 7,484,362 B2* | 2/2009 | Simon | F01N 13/14 285/300 |
| 2006/0067860 A1* | 3/2006 | Faircloth, Jr. | F01N 3/0211 422/171 |
| 2012/0146324 A1 | 6/2012 | Keyes | |

* cited by examiner

FLEXIBLE INSULATION DEVICE

This application claims the benefit of U.S. Provisional Application No. 61/846,415 entitled "Articulated Insulation Device," filed Jul. 15, 2013, and U.S. Provisional Application No. 61/887,014 entitled, "Flexible Insulation Device," filed Oct. 4, 2013. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is temperature insulation.

BACKGROUND

There are many instances in which it can be advantageous to thermally insulate an object. Examples include insulation for hot and cold fluid containers and fluid carrying pipes, where the term "fluid" should be interpreted as including liquids, gasses and indeed any composition that flows.

In some instances the object to be insulated is mechanically coupled to one or more members that vibrate and/or move relative to the object or to each other. For example, a blower in a diesel engine is often mechanically coupled between an engine and a vehicle body. The engine has considerable vibration, and moves relative to the vehicle body in at least two degrees of freedom of motion, including rotation and displacement.

In such instances applying a prior art jacket to the object tends to result in loss of functionality and possibly eventual destruction of the jacket. For example, a pipe for recirculation of exhaust gas (EGR pipe) is located between components of the exhaust system and an engine intake and is at least partially exposed to the environment. Because its location, heat losses occur during the transfer of the hot exhaust gas from the exhaust system to the combustion chamber. To reduce unwanted heat transfer, EGR pipes are commonly wrapped with the insulating materials. Such materials can include a thermal blanket with stainless steel springs or wire, a metal, and fiberglass mat. However, during operation of the vehicle, components of the exhaust system and the engine move due to operation of the engine and interactions with rough road surfaces. Under such conditions the engine and components of the exhaust system move relative to each other and to the frame or body of the vehicle, to which such an EGR pipe is typically anchored. Such movements place considerable stress on the insulating materials wrapping the EGR pipe, causing them to be stripped off from the pipe. This can result in the need for can require frequent replacements of these insulating materials.

Insulation devices have been proposed that attempt to compensate for such motion through the use of expandable pipe sections. United States Patent Application No. US 2012/014634 to Keyes, for example, uses a flexible bellows and additional insulating and joining components to provide a watertight encasement for a traditional metal expansion joint. Similarly, U.S. Pat. No. 5,134,846 to White discloses the use of a flexible metal sleeve that holds insulating materials in contact with exhaust system components. Such approaches do accommodate movement between the joined structures, but do so at the cost of compressing the insulating material. Such compression reduces the effectiveness of the insulating material and can result in damage that requires replacement. U.S. Pat. No. 5,092,122 to Bainbridge describes the use of a pair of corrugated metal tubes that have a space between them that is filled with insulating material. These can be slid over a pipe to provide insulation, the corrugations allowing for a certain degree of movement. Such a device, however, places the inner corrugated tube in contact with the pipe being insulated, and can abrade the pipe surface as components to which the pipe is connected move.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for insulation devices, methods and materials that accommodate significant movement of joined components, or of an insulated component relative to an externally coupled component, without bucking of the insulation.

SUMMARY OF THE INVENTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The inventive subject matter is directed to apparatuses, systems, and methods of insulating a conduit where each end of the conduit experiences uncoordinated movement. In one aspect of the inventive subject matter, an insulating device includes a thermal insulation jacket and a pliant segment. The pliant segment has two end caps and it is enclosed within the temperature insulating jacket such that the jacket and the pliant segments are coupled by a sealing component. When coupled, a chamber is created between the thermal insulation jacket and the pliant segment, and the pliant segment defines a cavity that is open on each end and designed to permit fluid flow (e.g., fluids or gases).

The two seals are slideably disposed between the thermal insulation jacket and the end caps. In some embodiments, the seal is made from a rubber, a synthetic rubber, a polymer, asbestos, and silicone, or some combination thereof, and the seals are formed as continuous bands that extend along the entirety of the chamber. As the pliant segment bends, the seals move along the seal interfaces. In preferred embodiments, the pliant segment has caps on each end, which have a distal flange, a medial flange, and a seal interface. The pliant segment can additionally be constructed from composite laminates.

In some embodiments, the thermal insulation jacket can include a polymer fiber, a glass fiber, or a ceramic fiber, or some combination thereof. Devices of the inventive subject matter can further include a hose clamp landing at one end, a retention clip at one end, and an insulation medium disposed in the chamber. In some embodiments, the chamber has an opening at each end.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The recitation of ranges of values herein is merely intended to serve as a shorthand method of referring individually to each separate value falling within the range. Unless otherwise indicated herein, each individual value is incorporated into the specification as if it were individually recited herein.

DETAILED DESCRIPTION

Figure 1:
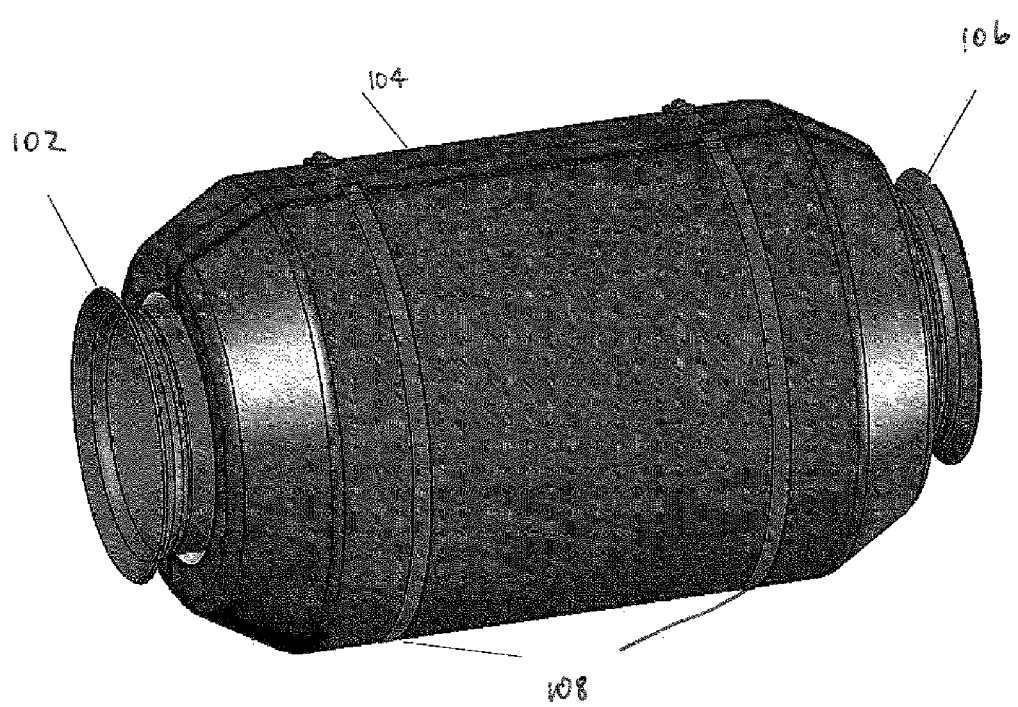
FIG. 1 shows an embodiment of the device when fully assembled.
Figure 2A:
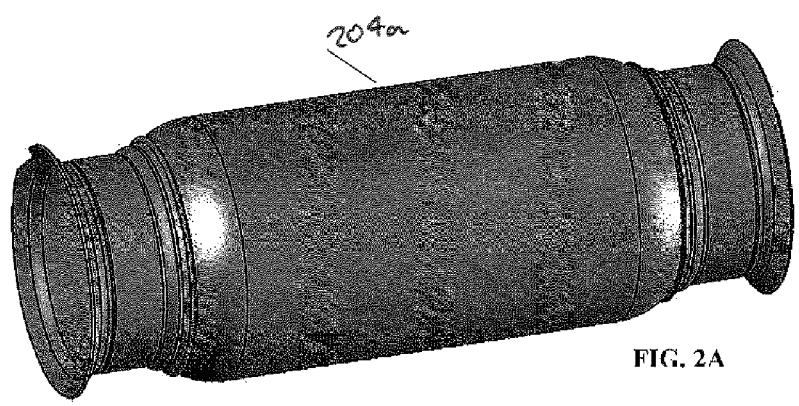
FIG. 2A shows the flexible segment in an unflexed configuration.
Figure 2B:
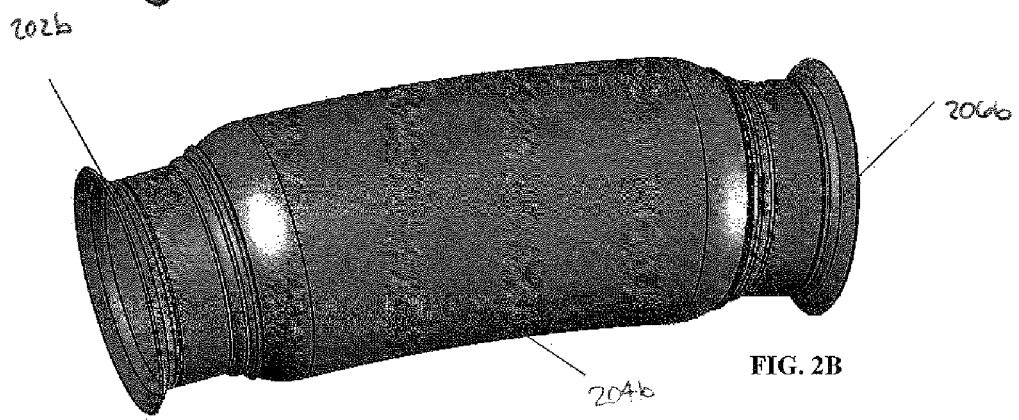
FIG. 2B shows the flexible segment in a flexed configuration.

An external view of an embodiment of the inventive concept can be seen in FIG. 1. A thermal insulation jacket 104 surrounds a pliant segment (for example, a flexible pipe or line) that terminates in a pair of end caps 102 and 106, which partially protrude from the thermal insulation jacket 104. The thermal insulation jacket 104 can be reinforced with one or more straps 108, which can serve to hold together separate components of a thermal insulation jacket 104. For example, a thermal insulation jacket 104 can be provided as two half sections, which can be conveniently fitted around a previously installed flexible pipe or line, and assembled into a thermal insulation jacket 104 using a pair of straps 108 to mate their complementary surfaces. A typical pliant segment of the inventive concept is shown in FIGS. 2A and 2B, which show a pliant segment in a straight configuration 204a and in a flexed configuration 204b, respectively. It should be noted that when the pliant segment 204b is flexed the two end caps 202b and 206b are no longer collinear and their surfaces are no longer parallel to one another.

In a prototype device of FIG. 1, the thermal insulation jacket 104 is a metal-asbestos-metal sandwich, essentially in the form of a barrel with an outer diameter of about 25 cm and a length of about 35 cm. The metal-asbestos-metal sandwich is about 5 mm thick, with both inner and outer metal dimpled stainless steel. The end caps 102 and 106 are made from the same metal-asbestos-metal sandwich material, and each has a length of about 3 cm to 10 cm. The seal is an asbestos rope about 0.5 to about 1.5 cm in diameter. As configured, the thermal insulation jacket 104 and end caps 102 and 106 permit a relative motion of about 2 cm of relative translation, and can effectively accommodate a pliant segment "bend" at of about 30°.

A thermal insulation jacket 104 of the inventive concept can include a skin having an insulating material sandwiched between outer and inner metal sheets. The metal sheets can be stainless steel or other suitable material, and are preferably dimpled. Dimpling is preferably present on the entire outer sheet. In embodiments where it is present on less than the entire sheet, it is preferably on at least a 1 cm$^2$, at least a 3 cm$^2$, at least a 10 cm$^2$, or at least a 20 cm$^2$ portion of the surface. The inner metal sheet can be smooth or dimpled. In embodiments where the inner metal sheet is dimpled, it is dimpled on at least a 1 cm$^2$, at least a 3 cm$^2$, at least a 10 cm$^2$, or at least a 20 cm$^2$ portion of the surface, especially in the region of the chamber. Any suitable insulating material can be sandwiched between the outer and inner metal sheets, including for example, at least one of a polymer fiber, a glass fiber, and a ceramic fiber. The same or different insulating material can additionally or alternatively be used within the chamber.

The seal is preferably a continuous band extending along a circumference of an end cap 102 or 106. The seal can be made of any suitable material, for example rubber, synthetic rubber, a polymer, asbestos, and silicone, and is preferably a ring-shaped rope. It is also preferred that the seal be temperature resistant (i.e. remaining resilient in temperatures between −50° C. and 300° C.). In some embodiments the seal is user replaceable. The seal can permit movement along one or more axes of an end cap 102 or 106 while providing a barrier between the interior of the thermal insulation jacket 104 and the exterior environment. In some embodiments the insulating materials can contact the seal. Similarly, in some embodiment at least a portion of a seal can lie within a channel or equivalent structure of the thermal insulation jacket 104, which can serve to hold the seal in place relative to the thermal insulation jacket 104 and to compress the seal against an outer surface (such as the seal interface) of an end cap 102 or 106.

The pliant or flexible segment can lie within a cavity or space defined by the thermal insulation jacket 104, and can be made of any suitably flexible and temperature resistant material. Examples of such materials include rubber, synthetic rubber, a polymer, asbestos, and silicone. A pliant segment can also include a metal or fabric mesh that can serve to provide mechanical reinforcement. Pliant segments of the inventive concept can be constructed from composite laminates, with different layers of laminates comprising different materials. Such a pliant or flexible segment can, for example, conduct hot fluids between two components that move relative to each other. At least one end of the pliant segment terminates in an end cap 102 or 106, which can include a seal interface region dimensioned to accommodate the movements of a seal relative to the end cap during use.

The end cap can be made of any suitably temperature resistant material, for example brass, stainless steel, aluminum, and temperature resistant plastics. For example, a seal interface region can be a smooth, recessed band that surrounds a portion of the end cap. An end cap can include a distal flange, which forms part of a connection with one of a set of components joined by the pliant segment. Similarly, an end cap can include a medial flange, which forms at least part of a connection between the end cap and the pliant portion of the pliant segment. Either or both of the distal flange and medial flange can be sloped toward the midline of the end cap, and can be configured to press against the seal as the plaint segment flexes, thereby providing an impetus that urges the seal towards the midline of the end cap and/or against an inner wall of the thermal insulation jacket 104. This advantageously serves to reinforce the sealing force applied during flexion of the pliant segment.

Figure 3A:
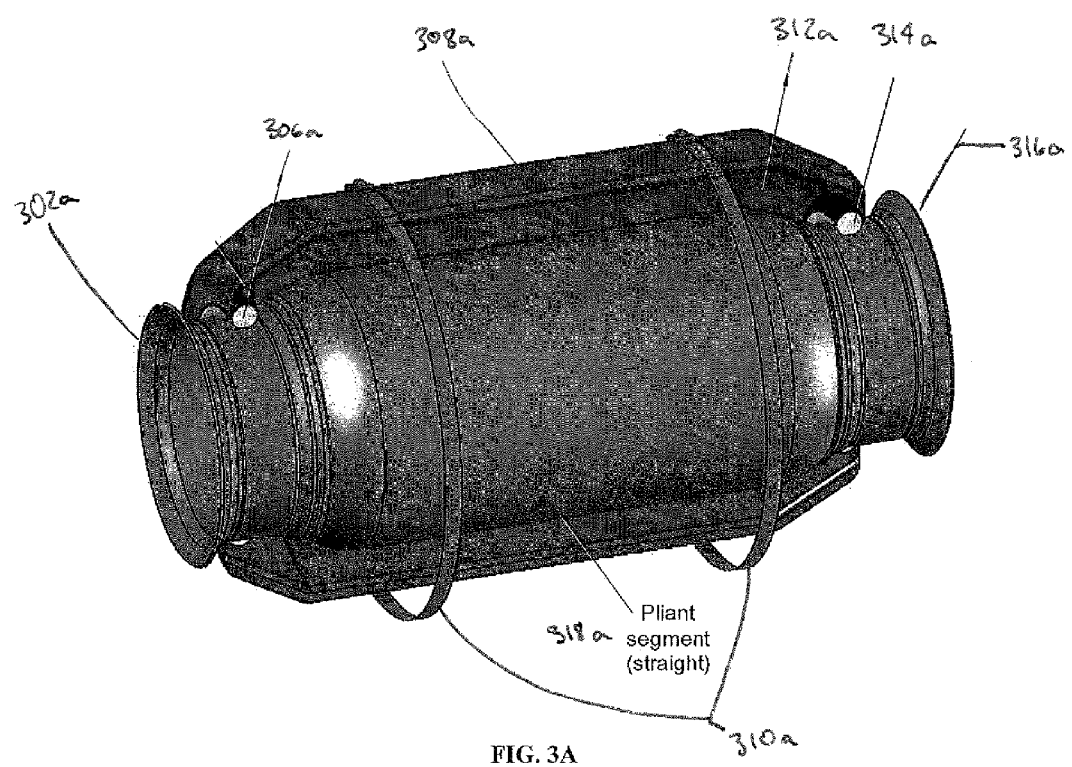
FIG. 3A shows the device with the thermal insulation jacket partially cutaway.
Figure 3B:
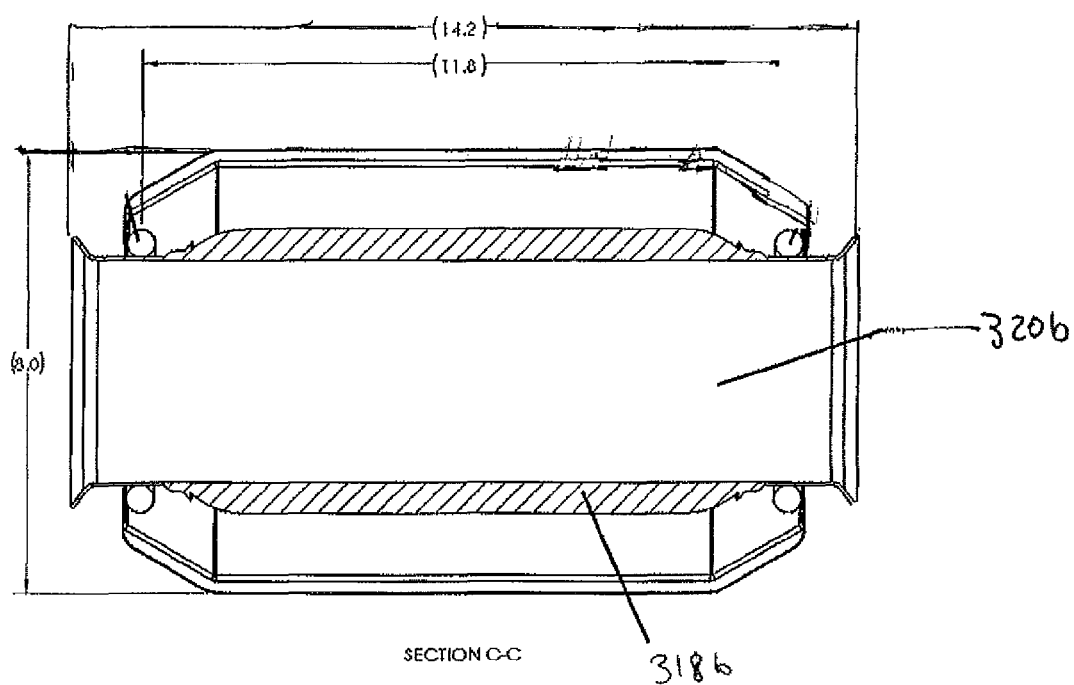
FIG. 3B is an engineering drawing of the embodiment of FIG. 3A.
Figure 3C:
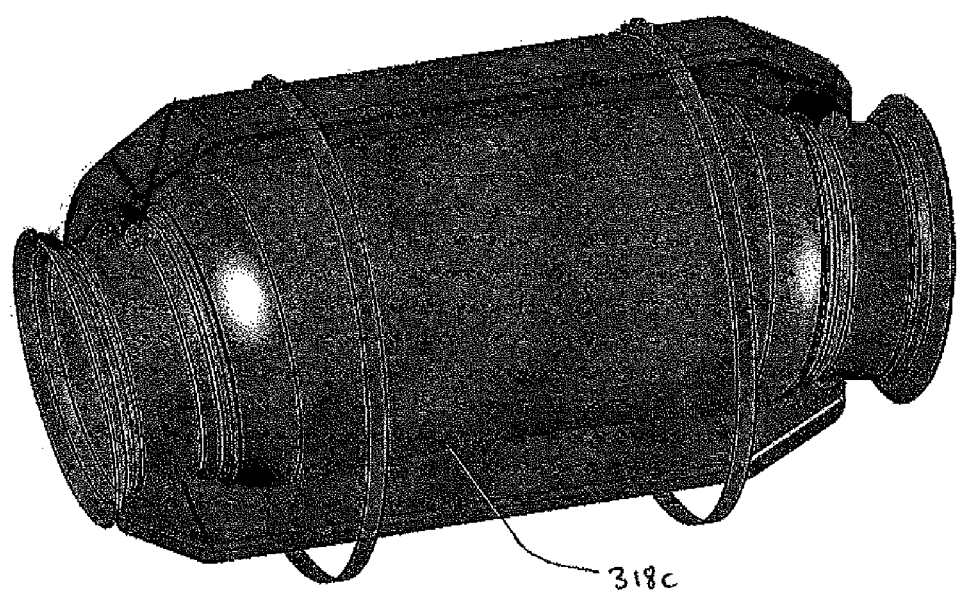
FIG. 3C shows an embodiment of FIG. 3A in a flexed configuration with the thermal insulation jacket partially cutaway.
Figure 3D:
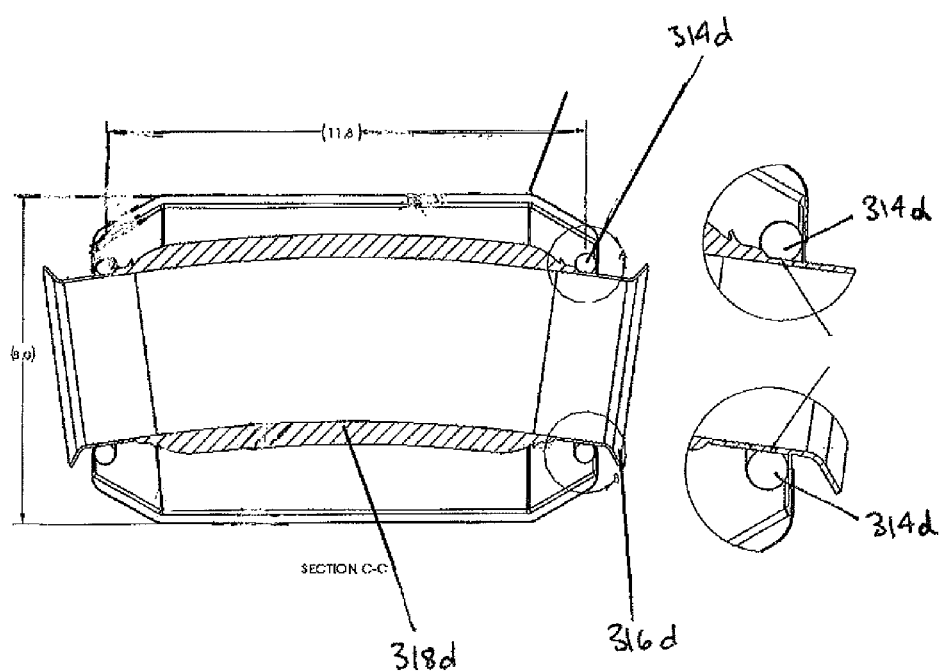
FIG. 3D is an engineering drawing of the embodiment of FIG. 3A in a flexed configuration.

Various views of devices of the inventive concept are shown in FIG. 3A, FIG. 3B, FIG. 3C, and FIG. 3D. FIG. 3A depicts a cutaway view of such a device when the pliant segment 318a is essentially linear. As shown, the pliant segment 318a essentially lies within a chamber 312a delineated by the thermal insulation jacket 308a, end caps 302a and 316a, and seals 306a and 314a. This chamber 312a can include insulating materials, such as fiberglass, which can contact the seals 306a and 314a. These seals 306a and 314a, in combination with insulation provided by the thermal insulation jacket 308a (and in some embodiments insulating material within the chamber 312a), provides the desired thermal isolation of the pliant segment 318a. FIG. 3B depicts a cross section of the device shown in FIG. 3A, with the pliant segment 318b in a straight configuration. As shown, a device of the inventive concept can include a cavity 320b (shown as at least partially enclosed by the pliant segment 318b). This cavity 320b can be open at both ends, and can serve to provide fluid communication between moving components connected by a device of the inventive concept. FIG. 3C shows a cutaway view of the device in FIG. 3A with the pliant segment 318c flexed, representing a configuration of the device that occurs when components to which the device is joined move relative to one another. A cross section of a device of the inventive concept in this flexed or bent configuration is shown in FIG. 3D. FIG. 3D also includes an inset that illustrates the movement of the seal 314d along the end cap 316d as the device flexes. It should be appreciated that despite considerable distortion of the device the seal 314d continues to be compressed against and conform to end cap 316d of the pliant segment 318d or tube in order to form an effective seal. This insures that the pliant segment 318d remains thermally isolated.

Figure 4:
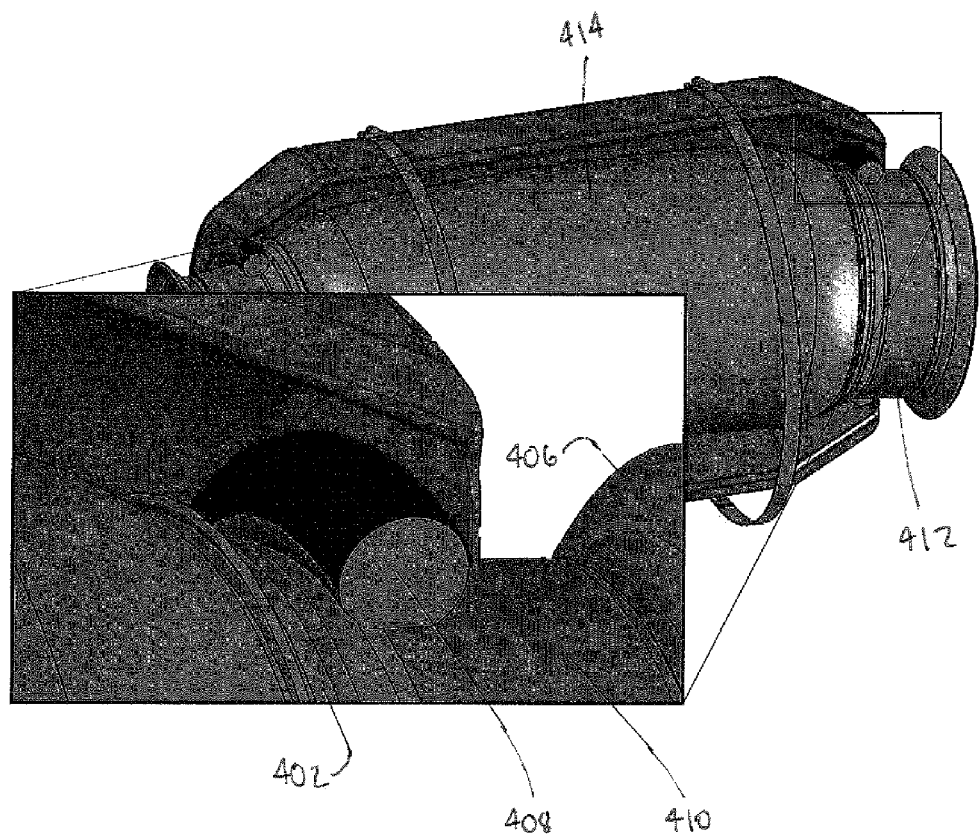
FIG. 4 shows a zoomed in end cap portion of a preferred embodiment of the device.

An expanded view of the interaction between the thermal insulation jacket 414, the seal 408, and the end cap 412 is provided in FIG. 4. The end cap 412 can include a seal interface 410 region, which lies between a distal flange 406 and a medial flange 402. As the pliant segment 414 flexes the seal 408 moves over the seal interface 410, maintaining thermal isolation. The medial flange 402 can be sloped, so that as the seal 408 approaches the medial flange 402 it is urged towards the central portion of the seal interface 410. The distal flange can be similarly sloped. This advantageously maintains sealing pressure as the pliant segment 414 flexes, particularly at extreme flexion.

In some embodiments of the inventive concept the device can include one or more straps (e.g., straps 310a of FIG. 3A) that encircle and reinforce the thermal insulation jacket. Similarly, one or preferably both end caps of the device can include coupling components, such as a hose clamp, a hose clamp landing, and a retention clip.

In situations where there is an especially large amount of movement, insulation devices could include a second thermal insulation jacket and a sealing cuff or similar component that can be used as a thermal insulation jacket articulation point, placed at a position between the two end caps. Such a sealing cuff can resemble two end caps joined at or near their medial flange, and can permit the utilization of multiple pliant segments and thermal insulation jackets. Such sealing cuffs can be straight or angled. In such an embodiment each of the thermal insulation jackets would interface with one end cap and with the sealing cuff, articulated in a similar manner to that discussed herein to the end cap and insulation jacket as described above. Additional sealing cuffs and thermal insulation jackets could be added to such an assembly (with one or more thermal insulation jacket interfacing only with sealing cuffs) in order to support even higher degrees of movement or flexion.

Generally, the articulating insulation device is designed to be installed in a place where there is relative movement between two components that are joined by a line, pipe, or similar device that requires insulation. In some instances one component can be reasonably stationary relative to the immediate environment and to the second component. In other instances both components can be moving relative to their immediate surroundings and to each other. For example, one end cap of the insulation device installed on an EGR pipe be connected to the inlet manifold of an internal combustion engine, and the other end cap can be fastened to the exhaust system. As a vehicle carrying these components moves along the road both the engine and components of the exhaust system move in response to both the action of the moving part of the engine and to bumps, potholes, debris, and other imperfections in the road surface. In such an embodiment, due to the axially slidable nature of the end caps and the flexible nature of the pliant segment, the insulation device flexibly bends or slides according to the relative movements of the engine and the exhaust system.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An insulation device comprising:
    a thermal insulation jacket comprising a first terminal opening, a second terminal opening, and a lumen;
    a pliant segment coupled to at least partially enclose a cavity, at least a portion of the pliant segment positioned within the lumen and comprising first terminus, a second terminus, a first end cap affixed to the first terminus and extending from the first terminal opening, and a second end cap affixed to the second terminus and extending from the second terminal opening;
    a chamber disposed between the thermal insulation jacket and the pliant segment;
    a first seal interface comprising a first seal interposed between the thermal insulation jacket and a first seal contact region of the first terminus, wherein the first seal is impressed into contact with the first seal contact region with sufficient force to permit relative movement between the thermal insulation jacket and the pliant segment while maintaining contact as the pliant segment bends by up to 30°; and second seal interface comprising a second seal interposed between the thermal insulation jacket and a second seal contact with the second seal contact region with sufficient force to permit relative movement between the thermal insulation jacket and the pliant segment while maintaining contact as the pliant segment bends by up to 30°.

2. The device of claim 1, wherein the first seal is a continuous band extending along an entirety of the chamber.

3. The device of claim 1, wherein the first end cap comprises a distal flange, a medial flange, and a seal interface.

4. The device of claim 3, wherein the first seal moves along the first seal contact region as the pliant segment bends.

5. The device of claim 1, wherein the thermal insulation jacket comprises at least one of a polymer fiber, a glass fiber, and a ceramic fiber.

6. The device of claim 1, further comprising a hose clamp landing at a first end of the device.

7. The device of claim 1, further comprising a retention clip at a first end of the device.

8. The device of claim 1, wherein the chamber has an opening at each end of the device.

9. The device of claim 1, further comprising an insulation medium disposed in the chamber.

10. The device of claim 1, wherein the seal comprises a material selected from the list consisting of rubber, synthetic rubber, a polymer, asbestos, and silicone.

11. The device of claim 1, wherein the pliant segment further comprises a material selected from the list consisting of rubber, synthetic rubber, a polymer, asbestos, and silicone.

12. The device of claim 1, wherein the pliant segment comprises composite laminates.

13. The device of claim 1, wherein the cavity is enclosed by the pliant segment.

14. The device of claim 13, wherein the cavity is open at each end.

15. The device of claim 14, wherein the cavity is configured to conduct a fluid.

\* \* \* \* \*